US006425735B1

(12) United States Patent
Sheth

(10) Patent No.: US 6,425,735 B1
(45) Date of Patent: Jul. 30, 2002

(54) CLAMP FOR A HORIZONTAL SKID WHICH ALLOWS AXIAL MOVEMENT OF PUMP

(75) Inventor: Ketankumar K. Sheth, Tulsa, OK (US)

(73) Assignee: Schlumberger Technolog Corporation, Sugar Land, TX (US)

( * ) Notice: Subject to any disclaimer, the term of this patent is extended or adjusted under 35 U.S.C. 154(b) by 0 days.

(21) Appl. No.: 09/713,278

(22) Filed: Nov. 15, 2000

(51) Int. Cl.$^7$ .......................... F04B 17/00; F16M 11/00
(52) U.S. Cl. ........................ 415/134; 417/363; 248/689; 248/675; 248/229.25; 248/227.4
(58) Field of Search .............................. 415/134, 213.1, 415/135, 126; 417/321, 360, 363, 361, 423.15; 248/214, 227.4, 229.2, 229.25, 674, 675, 676, 678, 689

(56) References Cited

U.S. PATENT DOCUMENTS

| | | | | |
|---|---|---|---|---|
| 1,346,925 A | * | 7/1920 | Wifley | 415/126 |
| 1,874,324 A | * | 8/1932 | MacMeeken | 415/134 X |
| 3,339,868 A | * | 9/1967 | Ehrens et al. | 248/674 |
| 3,719,429 A | * | 3/1973 | Rule | 417/360 X |
| 4,254,926 A | * | 3/1981 | Reeberg | 248/152 |
| 4,961,693 A | * | 10/1990 | Hoover et al. | 417/363 |
| 5,211,547 A | * | 5/1993 | Gaston et al. | 417/360 |
| 5,378,121 A | * | 1/1995 | Hackett | 417/363 |
| 5,411,378 A | * | 5/1995 | Sipin | 417/360 |
| 5,951,248 A | * | 9/1999 | Hall | 415/213.1 |

FOREIGN PATENT DOCUMENTS

| | | | |
|---|---|---|---|
| DE | 432915 | 8/1926 | |
| DE | 155866 | 9/1932 | |
| DE | 1023673 | 9/1955 | |
| DE | 2003218 A1 | * 7/1971 | ................. 417/360 |
| DE | 2655322 A1 | * 6/1978 | ............. 415/213.1 |
| DE | 115431 | 1/2001 | |
| FR | 2429342 | 4/1979 | |
| GB | 107105 | 7/1917 | |
| GB | 746347 | 3/1956 | |
| RU | 580349 A1 | * 11/1977 | ................. 417/360 |
| RU | 1240923 A1 | * 6/1986 | ............. 415/213.1 |
| WO | WO-870304 A1 | * 5/1987 | ................. 417/360 |

OTHER PUBLICATIONS

Three Way Splitter Gearbox for Hydraulic Pump Drives, vol. 106, No. 1269, p. 279, Shipbuilding & Marine Engineering International.

Hofmann, Heinrich, Vertical Pump for Compact Offshore Installations, No. 290, pp. 22–26, Nov. 1, 1990, Frankenthal, Germany.

\* cited by examiner

Primary Examiner—John E. Ryznic
(74) Attorney, Agent, or Firm—Fletcher Yoder & Van Someren

(57) ABSTRACT

A system for accommodating thermal expansion of a pump housing. The system includes a pump having an external housing, and a mounting structure for mounting the pump. Contacting members are disposed intermediate the mounting structure and the pump for allowing one-dimensional movement of the external housing along a longitudinal axis of the external housing. Alternatively, bearing members are positioned to support the pump in the mounting structure, while allowing a thermal distortion of the housing.

33 Claims, 4 Drawing Sheets

CLAMP FOR A HORIZONTAL SKID WHICH ALLOWS AXIAL MOVEMENT OF PUMP

FIELD OF THE INVENTION

The present invention relates generally to mounting assemblies, and particularly to mounting assemblies for fluid delivery devices subject to thermal variations.

BACKGROUND OF THE INVENTION

In a variety of applications, it is advantageous to utilize a horizontal pumping system ("HPS"), which generally includes a motor and a pump mounted on a horizontal skid. For example, an HPS may be used in applications such as water floods, liquid propane injection, water supply, booster service, salt water disposal and crude oil transfer.

In many applications, the HPS may be subject to thermal variations, distortions, vibrations and stresses leading to pump failure. For example, displacing high temperature fluids through an HPS typically leads to thermal growth of the pump. Existing HPSs fixedly mount the pump to the horizontal skid, thereby preventing movement of the pump as the pump grows and contracts due to thermal variations. The fixed mounting technique combined with these thermal variations results in mechanical stresses, fatigue and eventually mechanical failure and downtime of the HPS.

Accordingly, it would be advantageous to provide a pump mounting assembly to permit thermal distortions (expansion and contraction) of the HPS components, thereby reducing stresses and mechanical failure of the HPS. For example, allowing axial expansion of the pump may significantly reduce fatigue and stresses and improve the lifetime performance of the HPS.

SUMMARY OF THE INVENTION

The present invention features a system for accommodating thermal expansion of a pump housing. The system includes a pump having an external housing, and a mounting structure for mounting the pump. Additionally, a plurality of contacting members are advantageously disposed intermediate the mounting structure and the pump. The contacting members are configured for allowing one-dimensional movement of the external housing along a longitudinal axis of the external housing.

Another aspect of the invention features a fluid delivery system including a pump having a housing, and a mounting structure for mounting the pump. Additionally, a plurality of bearing members are advantageously positioned to support the pump in the mounting structure, while allowing a thermal distortion of the housing.

Another aspect of the invention features a method for reducing wear of a fluid delivery device. The method includes the act of affixing the fluid delivery device to a support structure at a first predetermined axial position. Additionally, the method advantageously includes the act of providing a support at a second axial position that permits axial movement of the fluid delivery device to alleviate distortions from thermal variations.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
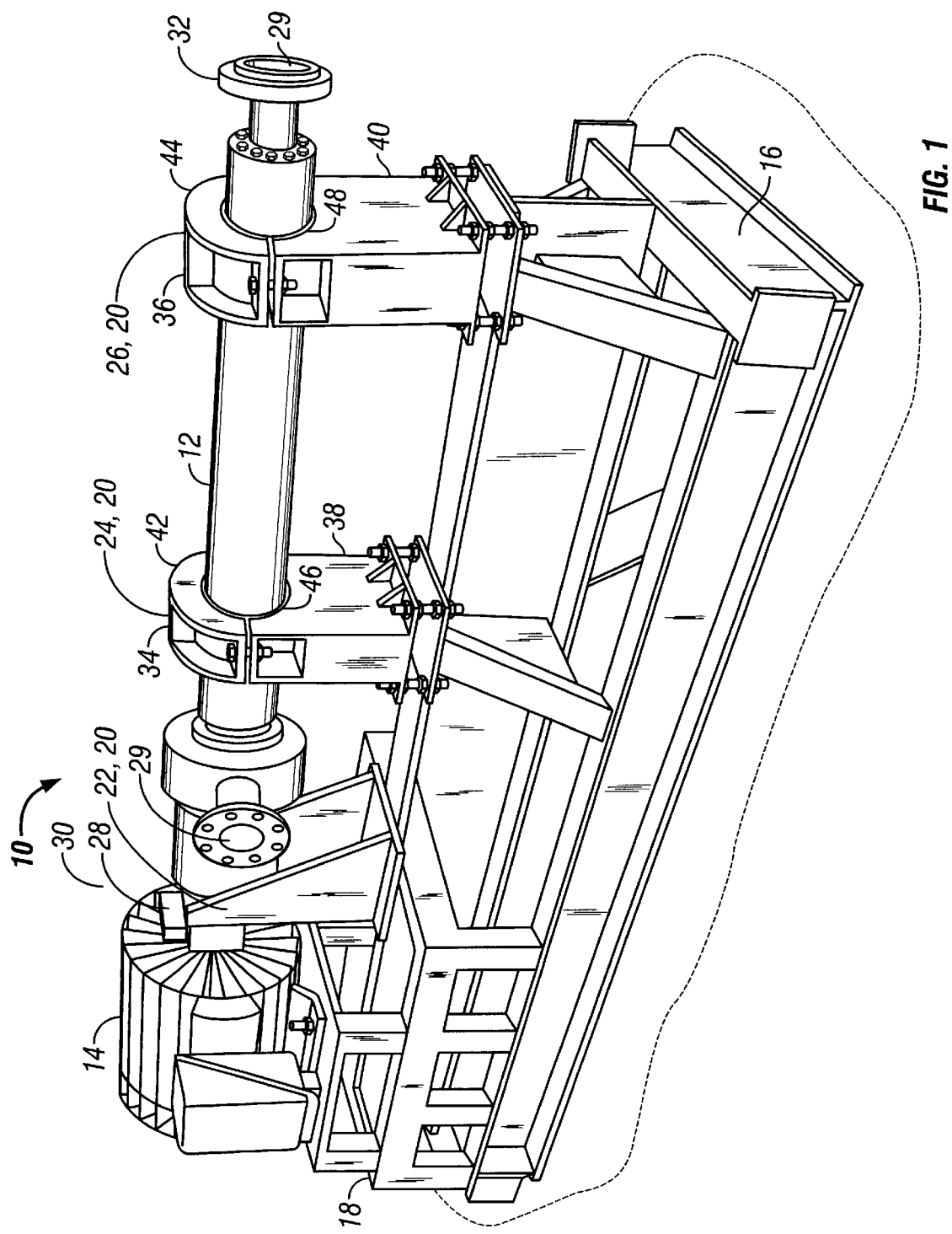
FIG. 1 is a perspective view of a horizontal pumping system having a mount assembly.

Referring generally to FIG. 1, an exemplary horizontal pumping system ("HPS") 10 is illustrated according to a preferred embodiment of the present invention. The HPS 10 includes a pump 12, a motor 14 drivingly coupled to the pump 12, and a horizontal skid 16 for supporting the pump 12 and the motor 14. Preferably, the pump 12 is a centrifugal pump or a positive displacement pump, while the motor 14 is an electric motor. However, the HPS may utilize other pumps 12 and motors 14 for a given application.

The motor 14 is fixedly coupled to the horizontal skid 16 at a motor mount surface 18 of the horizontal skid 16. The pump 12 is coupled to the horizontal skid 16 by a mount assembly 20. The mount assembly 20 includes a support 22 (e.g., a fixed support) and clamp assemblies 24 and 26. Support 22 extends outwardly from the motor mount surface 18 at an axial position 28 lengthwise along the horizontal skid 16. The pump 12 is drivingly coupled to the motor 14 through the support 22.

Alternatively, the support 22 may be an external conduit assembly configured for attachment to a pump conduit, such as one of two pump conduits 29 extending from the pump 12. The support 22, in either the illustrated configuration or as an external conduit assembly, may axially fix the pump 12 or may allow axial movement of the pump 12 with respect to the support 22. These pump conduits 29 are configured to receive and expel a fluid, or vice versa, as the pump 12 operates. For example, the pump 12 may displace water, salt water, sewage, chemicals, oil, liquid propane, or other fluids in through one of the pump conduits 29 and out of the other pump conduit 29. In addition, the temperature of the fluids may vary. For example, some applications may involve pumping hot fluids, while others may involve pumping cold fluids. In addition, the temperature may change during the pumping operation, either from the source of the fluid itself, or possibly due to the heat generated by the operation of the pump 12 and/or the motor 14. In addition, temperature may change dramatically due to weather change.

Preferably, the pump 12 has a fixed end 30 and a free end 32, the fixed end 30 being axially fixed at the support 22. The clamp assemblies 24 and 26 are coupled to the horizontal skid at axial positions 34 and 36, respectively, and preferably generally parallel with the support 22. The clamp assemblies 24 and 26 have base members 38 and 40 and upper clamps 42 and 44, creating clamping conduits 46 and 48, respectively, for mounting the pump 12 in the clamping conduits 46 and 48.

In a preferred embodiment, the clamp assemblies 24 and 26 are configured to allow axial movement of the pump 12 through the clamping conduits 46 and 48. This axial freedom is intended to reduce stresses and fatigue, and possible mechanical failure, due to vibrations and thermal expansion/contraction of the pump 12. Furthermore, the number and geometry of clamp assemblies may vary depending on the application, size of the pump 12, and other factors.

Figure 2:
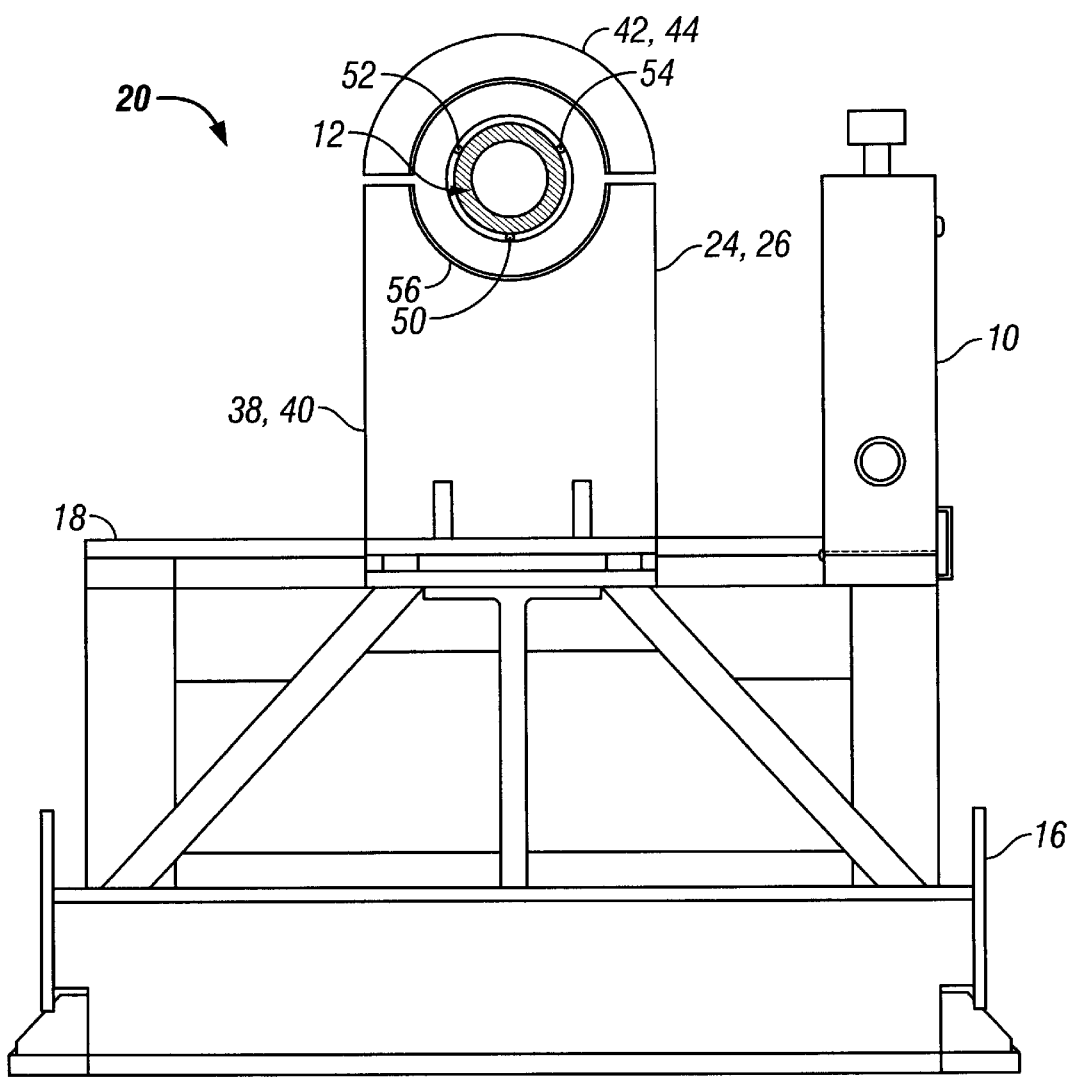
FIG. 2 is a cross-sectional view of the horizontal pumping system illustrating contacting members for the mount assembly.

FIG. 2 is a cross-sectional view of the HPS 10 illustrating an embodiment of the mount assembly 20 having contacting members 50, 52 and 54 disposed on an inner surface 56 of the clamp assemblies 24 and 26. The contacting members 50, 52 and 54 advantageously reduce the contact area, and consequently the frictional force, between the clamp assemblies 24 and 26 and the pump 12, thereby allowing the pump 12 to move axially within the clamping conduits 46 and 48. Although FIG. 2 illustrates three contacting members, the number and geometry of the contacting members may be changed depending on the application and design parameters. In each such design, the contacting members are used to reduce friction and promote axial freedom of the pump 12 within the clamping conduits 46 and 48.

Figure 3:
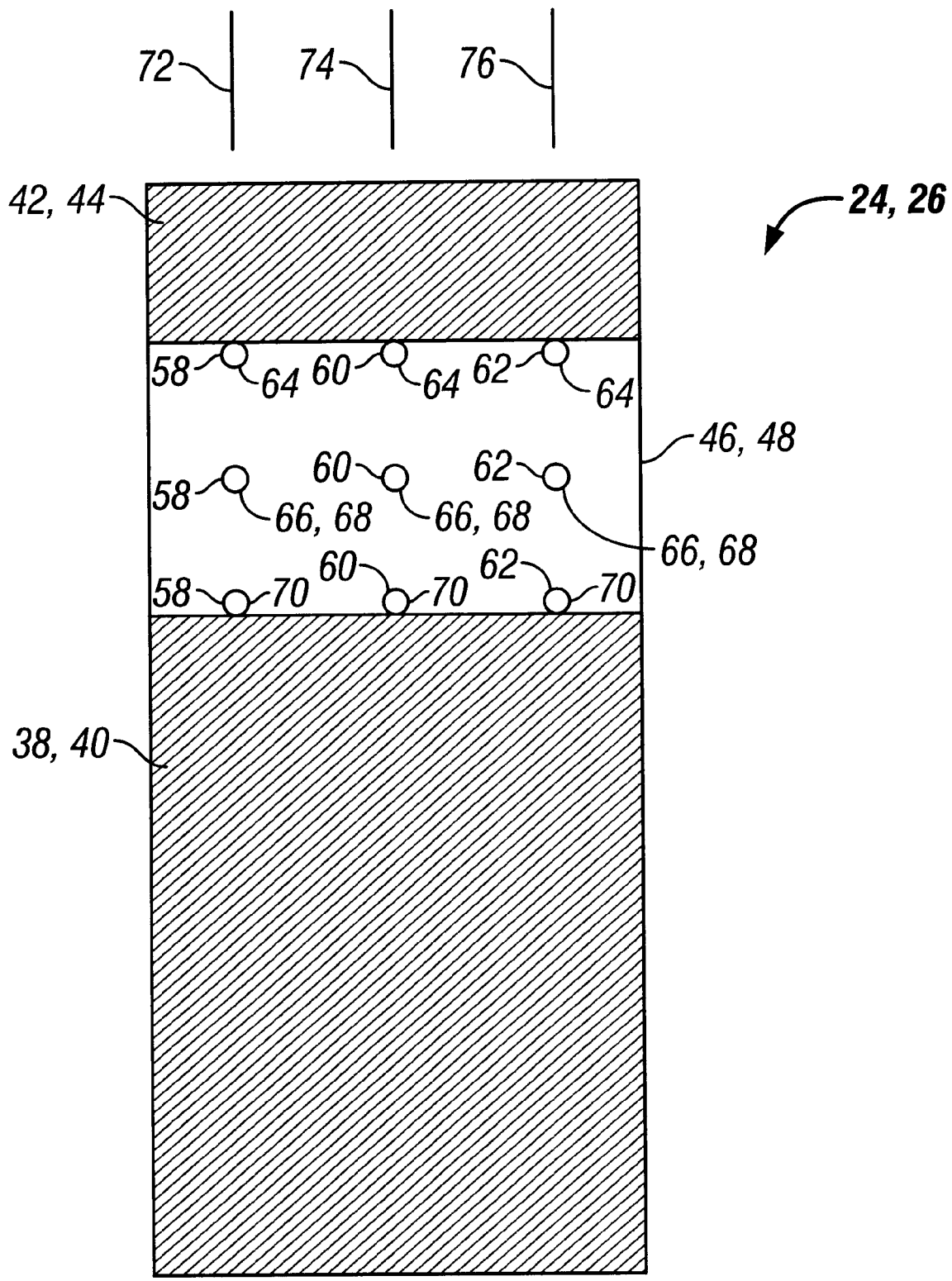
FIG. 3 is a cross-sectional view of the clamping assembly illustrating an alternate configuration of contacting members.

FIG. 3 is a cross-sectional view of the clamp assemblies 24 and 26 illustrating an alternate configuration of contacting members. The exemplary embodiment illustrated in FIG. 3 has three sets 58, 60 and 62 of contacting members, each set comprising four contacting members 64, 66, 68 and 70. The three sets 58, 60 and 62 are axially spaced along the clamping conduits 46 and 48 at axial positions 72, 74 and 76. Although the contacting members 64, 66, 68 and 70 illustrated in FIG. 3 are angularly spaced about the clamping conduits 46 and 48 at equal angles, the contacting members may be spaced at other angles to better support movement of the pump 12 through the clamping conduits 46 and 48. Also, the clamp assemblies 24 and 26 may have other numbers of sets, and the sets 58, 60 and 62 may have other numbers of contacting members depending on the application.

Figure 4:
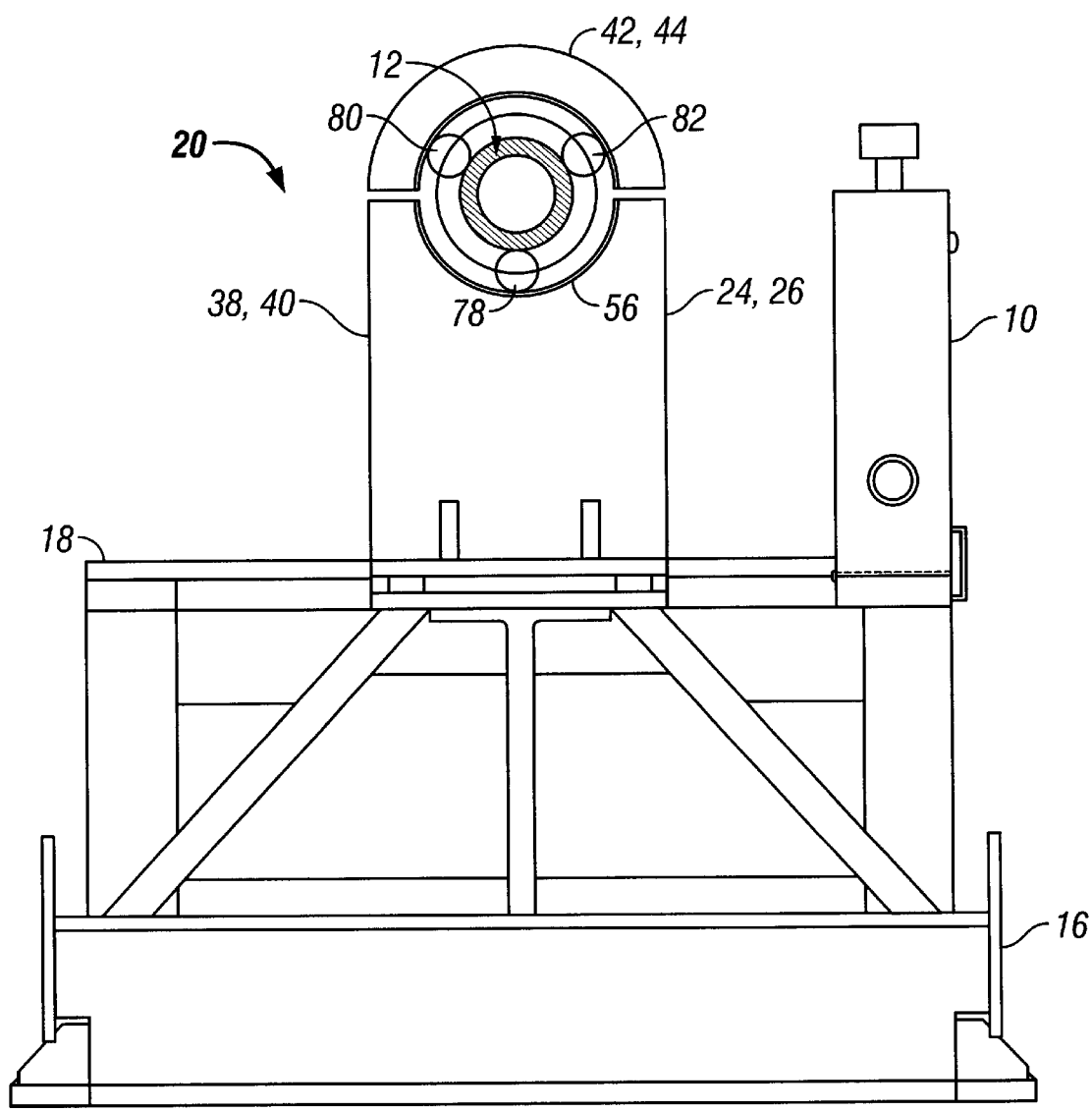
FIG. 4 is a cross-sectional view of the horizontal pumping system illustrating bearing members for the mount assembly.

FIG. 4 is a cross-sectional view of the HPS 10 illustrating an alternate embodiment of the mount assembly 20 having bearing members 78, 80 and 82 disposed on the inner surface 56. The bearing members 78, 80 and 82 are preferably ball bearings or roller pin bearings, which further improve the axial freedom of the pump 12 within the clamping conduits 46 and 48. Alternatively, the bearing members 78, 80 and 82 may embody needle bearings, or rotatable members disposed in a holder or cage. The bearing members 78, 80 and 82 advantageously create rotatable contacts between the clamp assemblies 24 and 26 and the pump 12, thereby significantly reducing any resistance to axial movement of the pump 12 while maintaining lateral and vertical support of the pump 12. Although FIG. 4 illustrates three bearing members, the number and geometry of movable or rotatable bearing members may be changed, while still reducing friction and promoting axial freedom of the pump 12 within the clamping conduits 46 and 48. For example, there may be more than one set of bearing members 78, 80 and 82 in each of the clamping conduits 46 and 48. Also, there may be multiple bearing members disposed at locations around the inner surface 56, or there may be multiple sets of bearing members disposed at multiple axial locations along the inner surface. For example, the bearing members 78, 80 and 82, as illustrated in FIG. 4, may have an adjacent set of bearing members disposed axially behind or in front of the bearing members 78, 80 and 82 shown in FIG. 4.

Alternatively, the present invention involves a technique for reducing stress, fatigue and/or wear of a fluid delivery assembly such as the HPS 10. The technique includes the act of fixing a component of the fluid delivery assembly to a support assembly at a first axial position. For example, the technique may involve fixing the pump 12 to the support 22, as discussed above. The technique further includes providing a support member for the component at a second axial position. Such a support member is configured to allow axial movement of the component. This axial movement may be desirable to alleviate stresses, fatigue and/or wear caused by vibrations, movement and/or expansion/contraction of the component, or other mechanical factors. For example, the pump 12 may expand/contract due to thermal variations in the HPS 10. Allowing axial movement of the component significantly reduces the chance for mechanical failure, and increases the life of the fluid delivery assembly.

The technique may further include introducing bearing members to enhance the axial movement of the component. The bearings may be disposed about the component in a configuration suitable for reducing resistance to axial movement. For example, three bearing members may be disposed about the pump 12, as previously discussed.

The technique may further include disposing the bearings, or bearing members, between the component and the support assembly. For example, bearing members may be disposed between the pump 12 and the clamp assemblies 24 and 26, as discussed above.

The technique also may also involve maintaining a mechanical clearance within the fluid delivery assembly by allowing the axial movement. For example, if an elongated component with internal parts is fixed at two axial positions, and the elongated component is subject to thermal variations causing actual expansion or contraction, the elongated component may bow or otherwise deform. This deformation could result in reduced internal clearances between moving parts, which could then cause increased wear and possible mechanical failure. Accordingly, providing the axial movement can be important for maintaining clearances and preventing undesirable wear and failure.

It will be understood that the foregoing description is of preferred exemplary embodiments of this invention, and that the invention is not limited to the specific forms shown. These and other modifications may be made in the design and arrangement of the elements without departing from the scope of the invention as expressed in the appended claims.

What is claimed:

1. A system for accommodating thermal expansion of a pump housing, comprising:
   a mounting structure;
   a pump having an external housing; and
   a plurality of contacting members disposed intermediate the mounting structure and the pump in contact with the external housing, wherein the external housing is slidable lengthwise along the plurality of contact members.

2. The system of claim 1, wherein the mounting structure has at least one support member disposed about the external housing at a position along a longitudinal axis of the external housing.

3. The system of claim 2, wherein at least a portion of the contacting members are disposed at the support member.

4. The system of claim 3, wherein a plurality of axially spaced sets of the contacting members are disposed at the support member.

5. The system of claim 4, wherein contacting members comprise bearings.

6. The system of claim 1, wherein the contacting members are disposed in movable contact with an outer surface of the external housing.

7. The system of claim 6, wherein the mounting structure comprises a guide structure for the contacting members.

8. A system for accommodating thermal expansion of a pump housing, comprising:
   a mounting structure;
   a pump having an external housing; and
   a plurality of contacting members each having a rotatable bearing disposed intermediate the mounting structure and the pump, wherein the external housing is movable lengthwise along the plurality of contacting members.

9. The system of claim 8, wherein each of the contacting members comprises a guide structure for the rotatable bearing, and at least three of the contacting members are disposed at an axial position along the external housing in different radial positions about the external housing.

10. The system of claim 8, wherein the rotatable bearing comprises a ball.

11. The system of claim 8, wherein the rotatable bearing comprises a pin.

12. The system of claim 1, wherein the plurality of contacting members are deployed in a plurality of sets disposed at different axial positions along the longitudinal axis.

13. The system of claim 12, wherein each set of the plurality of sets has the contacting members disposed at equally spaced radial positions about the external housing at the axial position.

14. The system of claim 13, wherein at least one set of the plurality of sets comprises three contacting members.

15. The system of claim 1, wherein the mounting structure is coupled to the external housing at a variable axial position along a longitudinal axis of the external housing.

16. The system of claim 15, wherein the external housing is slidable lengthwise in one-dimension within the mounting structure.

17. The system of claim 16, wherein the external housing is thermally expandable in the one-dimension.

18. The system of claim 16, wherein the external housing is dimensionally variable in the one-dimension.

19. The system of claim 16, wherein the variable axial position is adjacent an end of the external housing.

20. The system of claim 1, wherein the external housing is configured for fixed coupling to an external member at a fixed axial position along the longitudinal axis.

21. The system of claim 20, wherein the external member comprises a fluid conduit configured for fluid communication with a port disposed on the external housing at the fixed axial position.

22. A fluid delivery system, comprising:
a mounting structure;
a pump having a housing; and
a plurality of rotatable bearing members positioned to support the pump in the mounting structure while allowing a thermal distortion of the housing.

23. The system of claim 22, further comprising an attachment assembly configured to couple the mounting structure to the housing, wherein the plurality of rotatable bearings are disposed between the attachment assembly and the housing.

24. The system of claim 23, wherein the attachment assembly is disposed at an end of the housing.

25. The system of claim 22, wherein the pump is adapted to receive a fluid having a variable temperature.

26. The system of claim 22, wherein the pump is adapted to receive a fluid comprising water.

27. The system of claim 22, wherein the pump is adapted to receive a fluid comprising oil.

28. The system of claim 22, wherein the pump is adapted to receive a fluid comprising salt water.

29. The system of claim 22, wherein the pump is adapted to receive a fluid comprising liquid propane.

30. A method for reducing wear of a fluid delivery device, comprising the acts of:
affixing the fluid delivery device to a support structure at a first predetermined axial position; and
providing a multi-contact bearing support at a second axial position that permits axial movement of the fluid delivery device to alleviate distortions from thermal variations, wherein the multi-contact bearing support comprises at least three movable contact members.

31. The method of claim 30, further comprising the act of positioning the at least three movable contact members in contact with the fluid delivery device at different radial positions about the fluid delivery device.

32. The method of claim 31, further comprising the act of positioning the at least three movable contact members intermediate the support structure and a pump assembly utilized as the fluid delivery device.

33. The method of claim 30, further comprising the act of maintaining a clearance of an internal movable component of the fluid delivery device by allowing the axial movement.

* * * * *